Aug. 20, 1963        F. ALTER         3,101,189
VALVE
Filed Jan. 17, 1962
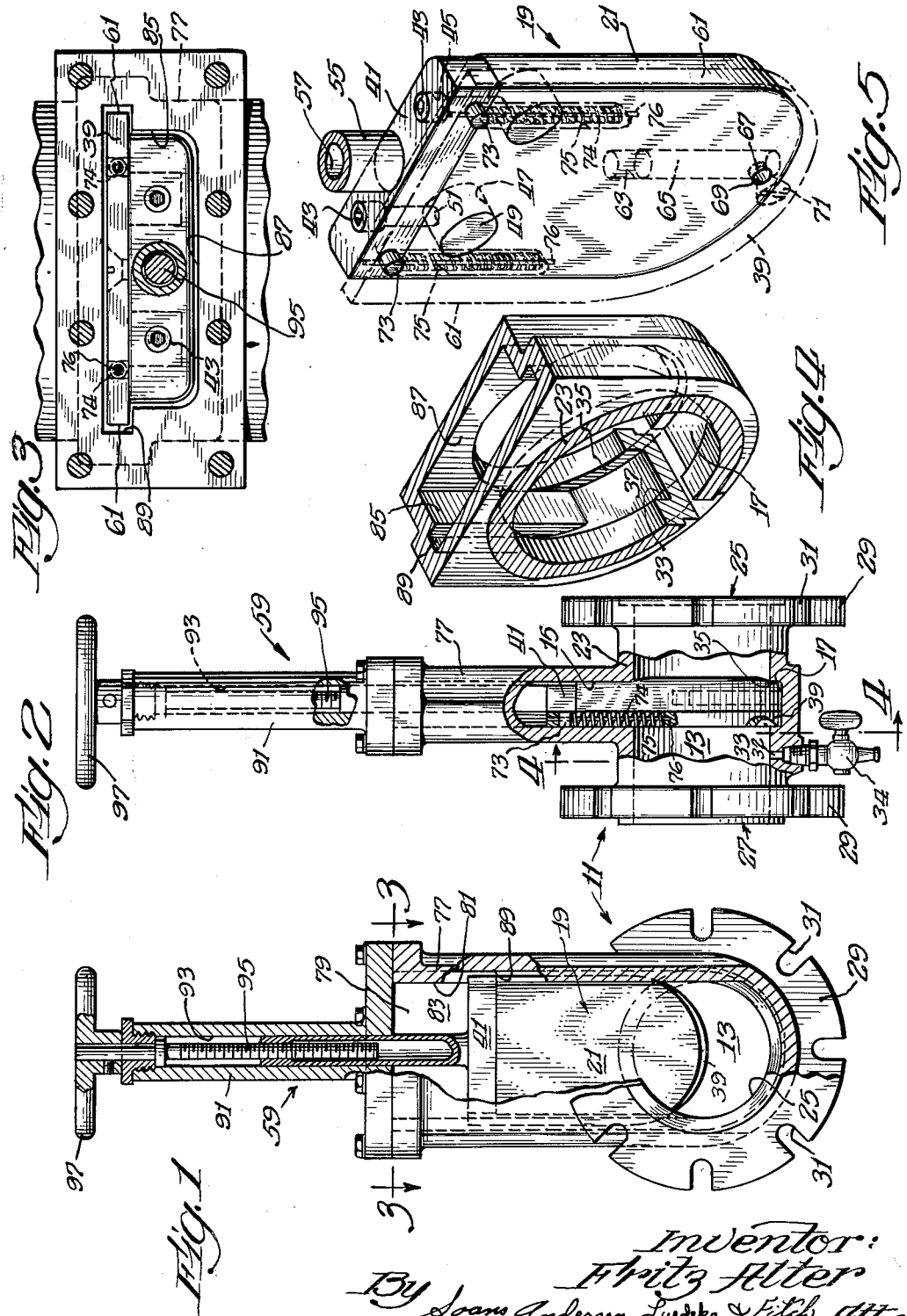
Inventor:
Fritz Alter
By Soans, Anderson, Luedeka & Fitch Attys.

United States Patent Office
3,101,189
Patented Aug. 20, 1963

3,101,189
VALVE
Fritz Alter, Pistaqua Heights, McHenry, Ill.
Filed Jan. 17, 1962, Ser. No. 166,752
6 Claims. (Cl. 251—187)

This invention relates to valves which regulate the flow of fluid by means of a movable gate and, in particular, to high pressure gas valves.

Gate or "straightway" valves normally include a valve body which defines a main fluid passageway, and a gate movable into and out of obstructing relation to the fluid passageway. The gate is generally formed of metal and is machined to a close tolerance so as to be seatable within a valve seat or groove provided in the wall of the passageway, the valve seat being also machined to a close tolerance.

While the use of a gate valve is frequently preferred because of the relatively small resistance which it offers to the flow of fluid when the gate is in a fully opened position, such valves have features which render them undesirable for certain applications. For example, when it is desired to insert a stopper in a main conducting gas at a high pressure, a gate valve is frequently used to prevent the escape of gas through the nipple while various adapters such as the cutting tool, the stopper, and plug are being interchanged. However, impurities such as small chips of metal resulting from the cutting operation are carried into the valve by the pressure of the fluid each time the valve is opened and these impurities accumulate in the valve groove. Accordingly they prevent the gate from seating properly and, when the impurities are chips of metal, cause burring of the edges of the gate so as to render it ineffective in providing a tight seal.

Accordingly, the principal object of the present invention is to provide an improved gate valve for regulating the flow of fluid.

An additional object of the invention is to provide a valve having a movable gate which includes a deformable plug adapted to intimately engage the walls of the valve seat when deformed within the seat.

A further object of the invention is to provide an improved gate for a gate valve.

A still further object of the invention is to provide a gate valve which is economical both as to its manufacture and its maintenance.

Other objects and advantages of the invention will become apparent with reference to the following description and the accompanying drawings.

In the drawings:

FIGURE 1 is a partially broken-away elevational view of a valve formed in accordance with the present invention as viewed in the direction of the longitudinal axis of the main passageway of the valve, and showing the valve gate in a partially open position;

FIGURE 2 is a partially broken-away elevational view of the valve of FIGURE 1 as viewed in a direction normal to the longitudinal axis of the main passageway of the valve, and showing the valve gate in the closed position;

FIGURE 3 is a fragmentary sectional view taken along line 3—3 of FIGURE 1;

FIGURE 4 is a partially broken-away fragmentary sectional view taken along line 4—4 of FIGURE 2; and FIGURE 5 is a perspective view of the valve gate shown in FIGURES 1 and 2, with a portion of the gate shown in phantom.

Very generally, a valve in accordance with the present invention comprises a valve body 11 having walls defining a main fluid passageway 13. An opening 15 extends through the wall of the valve body 11 into communication with the passageway 13, and a groove 17 is provided in the inner surface of the wall of the valve body opposite the opening 15 to provide a seat for a valve gate 19 which passes through the opening 15 into engagement with the groove. The gate 19 includes a resilient plug 21 which, when properly seated within the groove 17, is deformed in a manner which provides a fluid-tight obstruction to the flow of fluids through the passageway 13.

More specifically, the valve body 11 includes a generally cylindrical wall 23 which defines at its opposite ends inlet and outlet ports 25 and 27 respectively of the valve. Mounting means comprising flanges 29 extend radially outwardly from the wall 23 adjacent each of the ports 25 and 27, and are provided with slots 31 adapted to receive bolts or similar fasteners for securing the flanges to a portion of a main pipeline (not shown).

The opening 15 through which the gate 19 enters the passageway 13 is located in the side wall 23 of the valve body and has a generally rectangular configuration substantially the same as the cross-sectional configuration of the gate 19, to be described in more detail shortly. However, sufficient clearance is provided between the sides of the opening 15 and the walls of the gate to permit the gate to slide freely therethrough and to be deformed slightly within the opening.

When the valve is used in conjunction with a cutting apparatus secured to the valve body adjacent the outlet port 27, as when a stopper is inserted into the line, a pocket of gas will be trapped intermediate the gate and the cutting tool after the tool has been withdrawn and the gate closed. This trapped gas would normally be released substantially instantaneously when the cutting apparatus is removed from the valve, possibly causing injury to the workmen or to the apparatus. Accordingly, a bleeder duct 32 is provided in the wall 23 of the valve body adjacent the outlet port 27, and a small stop cock 34 is secured to the valve body adjacent the end of the duct to regulate the venting of air therethrough. The outer end of the stop cock is adapted to receive a hose (not shown). The trapped gas may thus be released to the atmosphere at a point remote from the area in which the work is being done prior to the removal of the cutting apparatus.

Located on the inner surface of the wall 23 directly opposite to the opening 15 is the groove 17 within which the gate 19 seats when in the fully closed position. The groove 17 has a chordal length slightly greater than the width of the gate 19 and is defined by a pair of opposing edge walls 33 and 35 disposed along opposite sides of a curved wall 37. Accordingly, the groove is capable of accommodating the entire leading edge of the gate 19 as well as a small portion of the gate inwardly of the edge.

The gate 19, as shown most clearly in FIGURE 5, includes the resilient plug 21 and a plate 39 carried by the plug to provide structural support therefor during its movement as well as during its deformation. The plug 21 is preferably formed of a rubber of medium hardness which can be easily deformed and yet is durable enough to withstand extended use. It has a generally rectangular cross-sectional configuration and is of a width slightly less than the diameter of the passageway 13. When the gate 19 is disposed within the passageway 13, the plug 21 is adjacent the inlet port 25 and faces the high pressure side of the line.

The leading edge of the plug 21 is arcuate, but of a radius slightly greater than that of the passageway 13 and, hence, the curved wall 37 of the groove 17. However, when the plug is deformed, its leading edge conforms to the curvature of the groove, as can be seen in FIGURE 2. Since the plug is formed of a resilient material, it is capable of accommodating itself to impurities which may accumulate in the groove 17 and will not be damaged to any appreciable extent by contact with the impurities.

In order to facilitate movement of the gate 19 and deformation of the plug 21, a support means in the form of a metal cap 41 is secured to the trailing edge of the plug. The cap 41 has a cross-sectional configuration substantially the same as that of the plug 21 and is secured to the plug by a pair of set screws 43 disposed in a pair of spaced and generally parallel holes 45 which extend through the cap and the rearward portion of the plug. A socket 47 extends into the inner face of the plug at the end of each of the holes 45 and receives a circular metal insert 49 having in a side wall thereof an opening 51 into which a set screw 43 is threaded.

A hollow rod 55 having a threaded bore 57 extends outwardly from the trailing edge of the cap 41 and is connected to an operating means 59, soon to be described, which effects movement of the gate. As will become apparent, movement of the gate 19 is accomplished solely by movement of the rod 55 acting through the cap 41 and plug 21.

The plate 39 is of a configuration substantially the same as that of the plug 21 but is slightly wider than the plug such that the side edges 61 of the plate project laterally past the adjacent side edges of the plug and serve to guide the gate in its movement. The leading edge of the plate is arcuate and of a radius substantially the same as that of the main passageway 13 and arcuate groove 17, the plate being thereby capable of abutting, along the length of its leading edge, the curved wall 37 of the groove.

Deformation of the plug 21 and sealing of the passageway 13 thereby is effected by placing the body of the plug in compression so as to cause its walls to expand outwardly into intimate engagement with the walls of the groove 17 and passageway 13. In the illustrated embodiment, the plug is placed in compression by securing it to the plate 39 at a point adjacent the leading edges of the plate and plug while causing the rearward portion of the plug to slide forwardly on the plate incident to a force applied to the rod 55.

Accordingly, a hole 63 extends inwardly of the leading edge of the plug 21 and receives a pin 65 having a threaded opening 67 extending laterally thereinto. An opening 69 is provided in the plate 39 and plug 21 adjacent the leading edges thereof to receive a set screw 71 which is threaded into the opening 67 of the pin, thereby securing the plate to the plug at a point adjacent the leading edge of the gate.

The rearward portion of the plug 21 is guided in its sliding movement on the plate 39 by a pair of lugs 73 which project outwardly from the inner side edge of the cap 41 and ride in a pair of slots 75 provided in the plate 39 in alignment with the lugs 73. The slots 75 are so positioned that when the plug 21 is in an undeformed condition, the lugs 73 are located at the trailing ends of the slots and will therefore engage the plate as the plug is being withdrawn from the fluid passageway 13.

It is desirable that the plate 39 precede the plug 21 into the passageway 13 so that the pressure of the fluid within the line will not cause the plug to curl around the leading edge of the plate. Accordingly, a compression spring 74, disposed within each of the slots 75 intermediate the lug 73 and the leading edge of the slot, biases the plate forwardly of the cap 41. A rod 76 extends axially of the slot and spring to maintain the spring in place.

When the gate is in the withdrawn position, i.e., when the valve is in the fully open position, it is disposed within a gate housing 77, the walls of which extend outwardly from the perimeter of the opening 15 in a direction normal to the longitudinal axis of the passageway 13. The housing 77 is, of course, hollow and defines a chamber 79 having edge walls 81 and face walls 83, and is of sufficient depth to permit the gate 19 to be retracted completely from the passageway 13. The housing is preferably formed so as to be integral with the valve body 11, as seen in FIGURE 2.

The walls of the housing 77 defining the gate-receiving chamber 79 and the walls of the valve body 11 defining that portion of the main passageway 13 adjacent the opening 15 serve as a guideway for the gate 19 and insure that the gate will seat properly within the groove 17. In this regard, walls defining a projection of the housing chamber 79 are provided in the interior of the valve body 11 and constitute generally a pair of opposing edge walls 85 which are tangent to the fluid passageway 13 and which merge at their inner ends with the groove 17, and a pair of opposing face walls 87 extending in a direction generally normal to the fluid passageway. A channel 89 extends the length of the edge wall 81 of the chamber 79 and of the edge walls 85 of the valve body 11 and is adapted to receive the projecting side edges 61 of the plate 39.

When the plug 21 is deformed, the arcuate leading edge thereof intimately engages the curved wall 37 of the groove 17. In addition the face and edge walls of the plug intimately engage the edge walls 33 and 35 of the groove and the edge walls 85 and face walls 87 of the guideway. It is therefore not possible for fluid to by-pass the gate 19 regardless of the pressure within the line and the valve is thus effective in completely stopping the flow of fluid therethrough.

Movement of the gate 19 and deformation of the plug 21 is accomplished by the operating means 59 which engages the hollow rod 55 and causes movement thereof. The operating means comprises a hollow casing 91 which is secured to the outer end of the housing 77 and which has an axial cavity 93 therein adapted to slidably receive the rod 55. A threaded valve stem 95 extends downwardly through the cavity 93 into the bore 57 of the rod 55 and engages the internal threads thereof. The stem 95 is journalled at the upper end of the casing 91 and projects outwardly therefrom a short distance for the attachment of a handle 97 effective to rotate the stem and thus effect movement of the rod 55 and, hence, the gate 19.

In the operation of the valve, suitable rotation of the handle 97 of the operating means 59 causes the gate to be moved inwardly of the main passageway 13 until the leading edge of the gate engages the curved wall 37 of the groove 17. Upon further rotation of the handle the plug 21 is placed in compression, causing the walls thereof to expand outwardly and to intimately engage the walls of the groove and guideway.

In opening the valve, the handle 97 is rotated in the opposite direction, thus relieving the compression of the valve plug and permitting a slight amount of fluid to bleed past gate. Further rotation of the handle, of course, causes the gate to be moved outwardly of the main passageway and into the gate housing 77.

It will be apparent therefore that the valve formed in accordance with the present invention does not entail the use of metal parts which must be machined to close tolerance in order to provide a satisfactory seal in the valve. Further, the resilient plug of the present invention is of a deformable material, and, hence, should impurities occupy the valve seat, the sealing ability of the plug will not be decreased to any appreciable extent.

Finally, the valve does not include parts which become quickly worn through use and which require remachining to maintain the valve in an efficient operating condition.

Although certain specific embodiments of the invention are shown and described, it will be understood that the details of the construction shown may be altered without departing from the scope of the invention as defined by the following claims.

What is claimed is:

1. A valve comprising a valve body defining a passageway extending therethrough, said passageway having at opposite ends an inlet port and an outlet port, a wall of said valve body defining an opening of generally rectangular cross-section extending laterally into said passageway, the wall of said passageway adjacent said opening defining a guideway extending from said opening inwardly of the walls of said passageway and generally normal to the longitudinal axis of said passageway, said guideway terminating at its inner end in a groove extending partially around said passageway, a gate including a resilient plug of generally rectangular cross-sectional configuration and a plate carried by said plug, said gate being mounted in said valve body for movement through said opening into and out of seating engagement with said groove, said plug being disposed adjacent said inlet port and having a leading edge seatable within said groove and a trailing edge opposite said leading edge, said plug being secured to said plate at a point adjacent the leading edge of said plug and plate with the trailing portion of said plug being slidable on said plate, and means for causing sliding movement of said trailing edge in a direction toward said leading edge so as to place said plug in compression and cause deformation thereof within said groove, thereby providing a fluid-tight engagement between the walls of said groove and said plug.

2. In a valve having a valve body defining a fluid passageway and a groove in the wall of said passageway, a gate adapted for movement into and out of obstructing relation to said passageway and seating engagement with the groove, which gate comprises a resilient plug having a leading and a trailing edge, said leading edge being seatable within said groove, and means for causing movement of said trailing edge in a direction toward said leading edge so as to cause deformation of said plug within said groove, said means including a plate fixed to said plug at a point adjacent the leading edge thereof and disposed such that the portion of said plug rearwardly of said point is slidable on said plate.

3. In a valve having a valve body defining a fluid passageway and a groove in the wall of said passageway, a gate adapted for movement into and out of obstructing relation to said passageway and seating engagement with the groove, which gate comprises a resilient plug having a leading and a trailing edge, said leading edge being seatable within said groove, and means for causing movement of said trailing edge in a direction toward said leading edge so as to cause deformation of said plug within said groove, said means including a plate fixed to said plug at a point adjacent the leading edge thereof and disposed such that the portion of said plug rearwardly of said point is slidable on said plate, and means for causing sliding movement of said rearward portion along said plate relative to said leading edge.

4. In a valve having a valve body defining a fluid passageway and a groove in the wall of said passageway, a gate adapted for movement into and out of obstructing relation to said passageway and seating engagement with the groove, which gate comprises a resilient plug having a leading and a trailing edge, said leading edge being seatable within said groove, and means for causing movement of said trailing edge in a direction toward said leading edge so as to cause deformation of said plug within said groove, said means including a plate fixed to said plug at a point adjacent the leading edge thereof and disposed such that the portion of said plug rearwardly of said point is slidable on said plate, means for causing sliding movement of said rearward portion along said plate relative to said leading edge, and means adjacent the trailing edge of said plug engageable with said plate so as to limit sliding movement of said rearward edge in a direction away from said leading edge.

5. In a valve having a valve body defining a fluid passageway, a groove in a wall of said passageway, and a channel in a wall of said groove; and a gate adapted for movement into and out of obstructing relation to said passageway and into and out of seating engagement with the groove, which gate comprises a resilient plug having a leading and a trailing edge, said leading edge being seatable within said groove, and means carried by said plug for causing deformation of said plug when said leading edge is seated within said groove and for guiding movement of said plug into seating engagement within said groove, said means comprising a plate fixed to said plug at a point adjacent the leading edge thereof and extending laterally past the side edges of said plug so as to ride in said channels provided in the said walls of said groove.

6. A valve comprising a valve body defining a passageway extending therethrough, a wall of said valve body defining an opening extending laterally into said passageway, the wall of said passageway adjacent said opening defining a guideway extending from said opening inwardly of the walls of said passageway, said guideway terminating at its inner end in a groove extending partially around said passageway, a gate including a deformable plug and a plate carried by said plug, said gate being mounted in said valve body for movement through said opening into and out of seating engagement with said groove, said plug having a leading edge seatable within said groove and a trailing edge opposite said leading edge, said plug being secured to said plate adjacent the leading edge of said plug and plate with the trailing portion of said plug being slidable on said plate, and means for causing sliding movement of said trailing edge of said plug in a direction toward said leading edge of said plug so as to place said plug in compression and cause deformation thereof within said groove, thereby providing a fluid tight engagement between the walls of said groove and said plug.

References Cited in the file of this patent

UNITED STATES PATENTS

| | | |
|---|---|---|
| Re. 25,177 | Anderson | May 29, 1962 |
| 1,149,057 | Hudson | Aug. 3, 1915 |
| 2,772,849 | Davis | Dec. 4, 1956 |
| 3,042,361 | Garrott | July 3, 1962 |
| 3,043,555 | Breher | July 10, 1962 |
| 3,057,595 | McKinney | Oct. 9, 1962 |